United States Patent
Teague (10) Patent No.: US 8,634,353 B2
(45) Date of Patent: Jan. 21, 2014

(54) APPARATUS AND METHOD FOR HYBRID AUTOMATIC REPEAT REQUEST

(75) Inventor: Edward Harrison Teague, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 535 days.

(21) Appl. No.: 11/670,370

(22) Filed: Feb. 1, 2007

(65) Prior Publication Data

US 2007/0211660 A1    Sep. 13, 2007

Related U.S. Application Data

(60) Provisional application No. 60/765,287, filed on Feb. 2, 2006.

(51) Int. Cl.
*H04W 4/00*    (2009.01)

(52) U.S. Cl.
USPC .......................................................... 370/329

(58) Field of Classification Search
USPC .......... 714/748, 749; 370/206, 473, 412, 329; 455/436
See application file for complete search history.

(56) References Cited

U.S. PATENT DOCUMENTS

| | | | |
|---|---|---|---|
| 6,697,988 B2 | 2/2004 | Kim et al. | |
| 6,760,860 B1 | 7/2004 | Fong et al. | |
| 6,813,264 B2 | 11/2004 | Vassilovski | |
| 7,328,017 B2 * | 2/2008 | Reed et al. | 455/436 |
| 7,509,554 B2 | 3/2009 | Lohr et al. | |
| 2002/0071407 A1 | 6/2002 | Koo | |
| 2002/0168945 A1 | 11/2002 | Hwang et al. | |
| 2003/0152062 A1 | 8/2003 | Terry et al. | |
| 2004/0042474 A1 * | 3/2004 | Walker et al. | 370/412 |
| 2004/0042492 A1 * | 3/2004 | Suzuki et al. | 370/473 |
| 2007/0153672 A1 * | 7/2007 | Terry et al. | 370/206 |
| 2007/0168827 A1 * | 7/2007 | Lohr et al. | 714/749 |
| 2008/0133995 A1 * | 6/2008 | Lohr et al. | 714/748 |

FOREIGN PATENT DOCUMENTS

| | | |
|---|---|---|
| CN | 1402463 A | 3/2003 |
| EP | 1583270 | 5/2005 |
| JP | 2005509210 | 4/2005 |
| RU | 2148889 | 5/2000 |
| RU | 2193820 | 11/2002 |
| RU | 2235437 | 2/2004 |
| WO | 2005060145 A1 | 6/2005 |

(Continued)

OTHER PUBLICATIONS

Overview of Enhanced Uplink for 3GPP W-CDMA: Amitava Ghosh, Robert Love, Nick Whinnett, Rapeepat Ratasuk, Weimin Xiao, Ravi Kuchibhotla, Motorola, GTSS, 1501 West Shure Drive, Arlington Heights, IL 60004; Motorola, PTS, Libertyville, IL 60048; pp. 2261-2265; 2004.*

(Continued)

*Primary Examiner* — Mark Rinehart
*Assistant Examiner* — Gbemileke Onamuti
(74) *Attorney, Agent, or Firm* — Howard Seo (57) ABSTRACT

Systems and methodologies are described that facilitate using both synchronous and asynchronous HARQ assignment schemes. According to various aspects, the system and methods are described for determining if a synchronous HARQ or an asynchronous HARQ assignment scheme should be used for providing a resource assignment and indicating whether the resource assignment is provided using the synchronous HARQ or an asynchronous HARQ assignment scheme.

41 Claims, 8 Drawing Sheets

(56) References Cited

FOREIGN PATENT DOCUMENTS

| WO | 2005071874 | A1 | 8/2005 |
| WO | 2005099152 | A1 | 10/2005 |
| WO | 05125109 | | 12/2005 |
| WO | 2006102744 | A1 | 10/2006 |
| WO | 2006105004 | A2 | 10/2006 |
| WO | 2006138379 | A2 | 8/2007 |

OTHER PUBLICATIONS

Taiwanese Search report—096103975—TIPO—Aug. 18, 2010.
International Search Report and Written Opinion—PCT/US07/061543, International Search Authority—European Patent Office—Jun. 22, 2007.
Samsung:"HARQ and required signalling information", 3GPP TSG-RAN WG1 Rel-6 Ad Hoc R1-040689, Jun. 2004, URL, http://www.3gpp.org/ftp/tsg_ran/WG1_RL1/TSGR1_AH/Rel-6_AH_JUN-04_Cannes/Docs/ZIPs/R1-040689.zip.

* cited by examiner

APPARATUS AND METHOD FOR HYBRID AUTOMATIC REPEAT REQUEST

CROSS-REFERENCE TO RELATED APPLICATION

This application claims the benefit of U.S. provisional application Ser. No. 60/765,287, filed on Feb. 2, 2006, and entitled AN APPARATUS AND METHOD HYBRID AUTOMATIC REPEAT REQUEST. The entirety of this application is incorporated herein by reference.

BACKGROUND

I. Field

The following description relates generally to wireless communications, and more particularly to schemes for providing assignments of resources.

II. Background

Wireless communication systems have become a prevalent means by which majority of people worldwide have come to communicate. Wireless communication devices have become smaller and more powerful in order to meet consumer needs, improve portability and convenience. The increase in processing power in mobile devices such as cellular telephones has lead to an increase in demands on wireless network transmission systems.

A typical wireless communication network (e.g., employing frequency, time, and code division techniques) includes one or more base stations that provide a coverage area and one or more mobile (e.g., wireless) terminals that can transmit and receive data within that coverage area. A typical base station can concurrently transmit multiple data streams for broadcast, multicast, and/or unicast services, wherein a data stream is a stream of data that can be of independent reception interest to a mobile terminal. A mobile terminal within the coverage area of that base station can be interested in receiving one, more than one or all the data streams carried by the composite stream. Likewise, a mobile terminal can transmit data to the base station or another mobile terminal.

Most modern data communication systems often employ Automatic Repeat Request (ARQ) mechanism(s) to improve packet transmission reliability. A packet transmission acknowledgement is signaled from the receiver to the transmitter using a low-rate feedback channel. A positive acknowledgement (ACK) indicates to the transmitter that the previous transmission is received correctly and that the receiver is ready for a new packet transmission. A negative acknowledgement (NAK), on the other hand, suggests that an error is detected in the previously transmitted packet and that a retransmission is required.

Generally, there are two categories of packet combining techniques: code combing and diversity combining. In code combining systems, sub-packets are concatenated to form noise-corrupted codewords from increasingly longer and lower-rate codes. An example of a code combing technique is the Type-II Hybrid ARQ (H-ARQ) protocol, where the transmitter responds to the retransmission requests by sending additional party bits to the receiver. The receiver appends these bits to the received packet, allowing for increased error correction capability. In diversity combining systems, the individual symbols from multiple, identical copies of a packet are combined to create a single packet with more reliable constituent symbols.

There are two primary ways of manner for performing HARQ in communication systems: synchronous and asynchronous. To reduce signaling overhead for assignments of resources, the system may employ "synchronous HARQ" and provide support for "sticky" assignments. With synchronous HARQ, the resources for successive retransmissions are not independently scheduled, but rather are allocated for all retransmissions associated with a packet. For example, an assignment of a set of hop-ports applies to one interlace. Assignments on different interlaces are independent, and an access terminal may be given resources on multiple interlaces. For an asynchronous HARQ, the resources are independently scheduled; generally, a new assignment is sent for each resource. Each technique has certain advantages. Most systems today use either synchronous or asynchronous HARQ for assignment of resources. A need exist for a single communication system that would benefit from being able to choose the type of HARQ on an assignment-by-assignment basis.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance an aspect, a method of using HARQ assignment, comprising: determining if a synchronous HARQ or an synchronous HARQ assignment scheme should be used for providing a resource assignment; and indicating whether the resource assignment is provided using a synchronous HARQ or an asynchronous HARQ assignment scheme.

In accordance an aspect, an apparatus for using HARQ assignment, comprising: means for determining if a synchronous HARQ or an asynchronous HARQ assignment scheme should be used for providing a resource assignment; and means for indicating whether the resource assignment is provided using the synchronous HARQ or an asynchronous HARQ assignment scheme.

In accordance an aspect, a method of using HARQ assignment, comprising: receiving a resource assignment grant; and determining if the resource assignment uses a synchronous HARQ or an asynchronous HARQ assignment scheme.

To the accomplishment of the foregoing and related ends, the one or more aspects comprise the features hereinafter fully described and particularly pointed out in the claims. The following description and the annexed drawings set forth in detail certain illustrative aspects of the one or more aspects. These aspects are indicative, however, of but a few of the various ways in which the principles of various aspects may be employed and the described aspects are intended to include all such aspects and their equivalents.

DETAILED DESCRIPTION

Various embodiment are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, ether hardware, firmware, a combination of hardware and software, software, or software in execution. For example, a component may be, but is not limited to being, a process running on a processor, a processor, an, object, an executable, a thread of execution, a program, and/or a computer. By way of illustration, both in application on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a mobile device. A mobile device can also be call a system, subscriber unit, subscriber station, mobile station, mobile, remote station, remote terminal, access terminal, user terminal, terminal, wireless communication device, user agent, user device, or user equipment (UE). A mobile device may be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station may be utilized for communicating with mobile device(s) and may also be referred to as an access point, Node B, or some other terminology.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Figure 1:
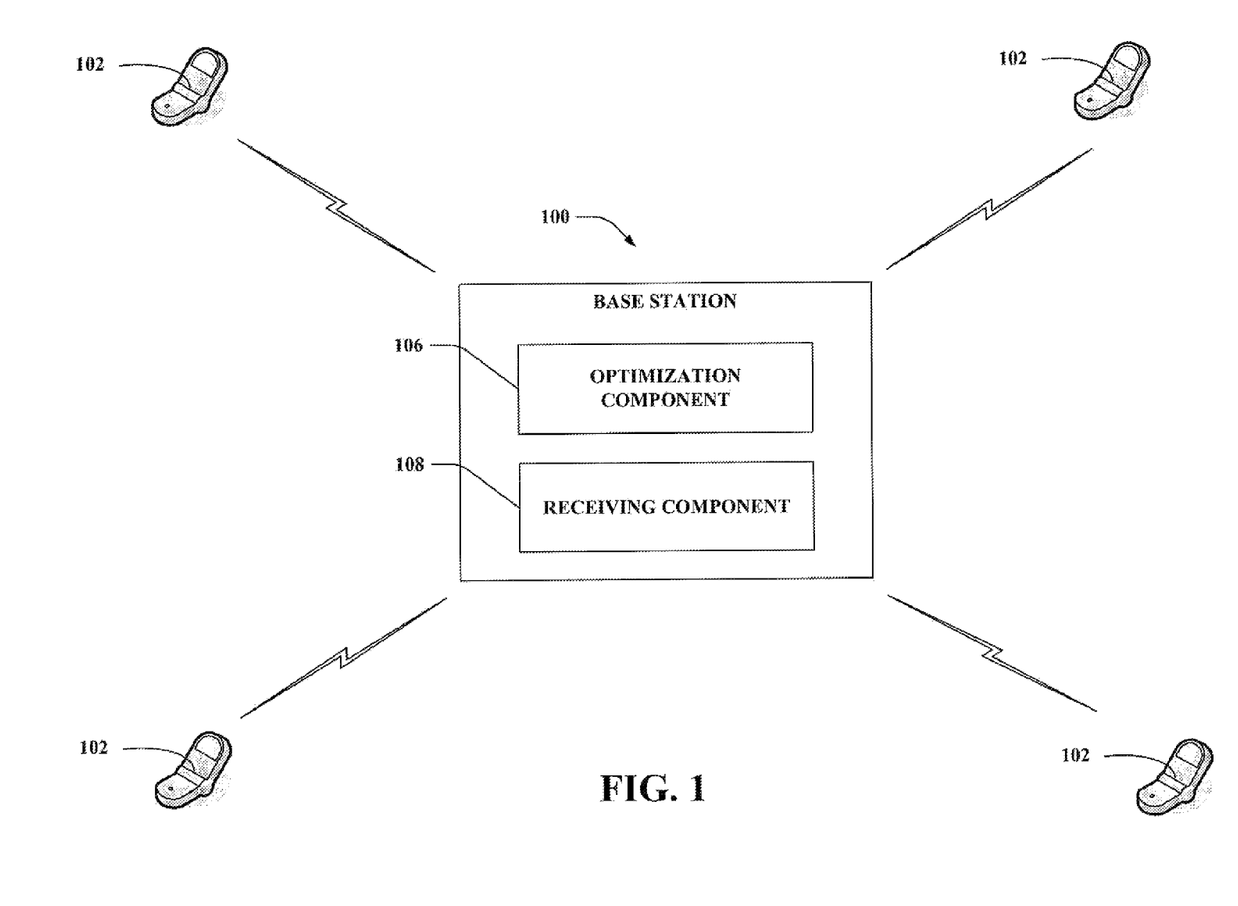
FIG. 1 is an illustration of an example system that effectuates optimal downlink transmission in a wireless communication environment.

Referring now to FIG. 1, a system 100 that effectuates optimal downlink transmission in a wireless communication environment is illustrated in accordance with various embodiments herein. Base station 102 is configured to communicate with one or more mobile devices 104. Base station 102 is comprised of an optimization component 106 that allows for multiplexing of localized and distributed transmissions, and a receiving component 108 that, for example, receives information regarding base station capabilities. Optimization component 106 allows for downlink transmission such that frequency diversity is achieved and overhead coasts associated with the transmission are mitigated via various schemes, as discussed infra. As can be appreciated, multiplexing of localized and distributed transmissions allows for accommodation of various traffic services, user abilities and further allows a user of the one or more mobile devices 104 to take advantage of channel properties. Moreover, for example, the one or more mobile devices 106 can provide the optimization component 106 at the base station 102 with information related to mobile device capabilities, an estimate of downlink channel conditions, and subscriber data. It is also to be appreciated that the base station 102 can determine a percentage of high speed versus low speed users, store subscriber data and information related to mobile device capabilities. Such capabilities of base station 102 can further allow optimization component 108 to choose the optimal multiplexing scheme according to surrounding conditions.

Figure 2:
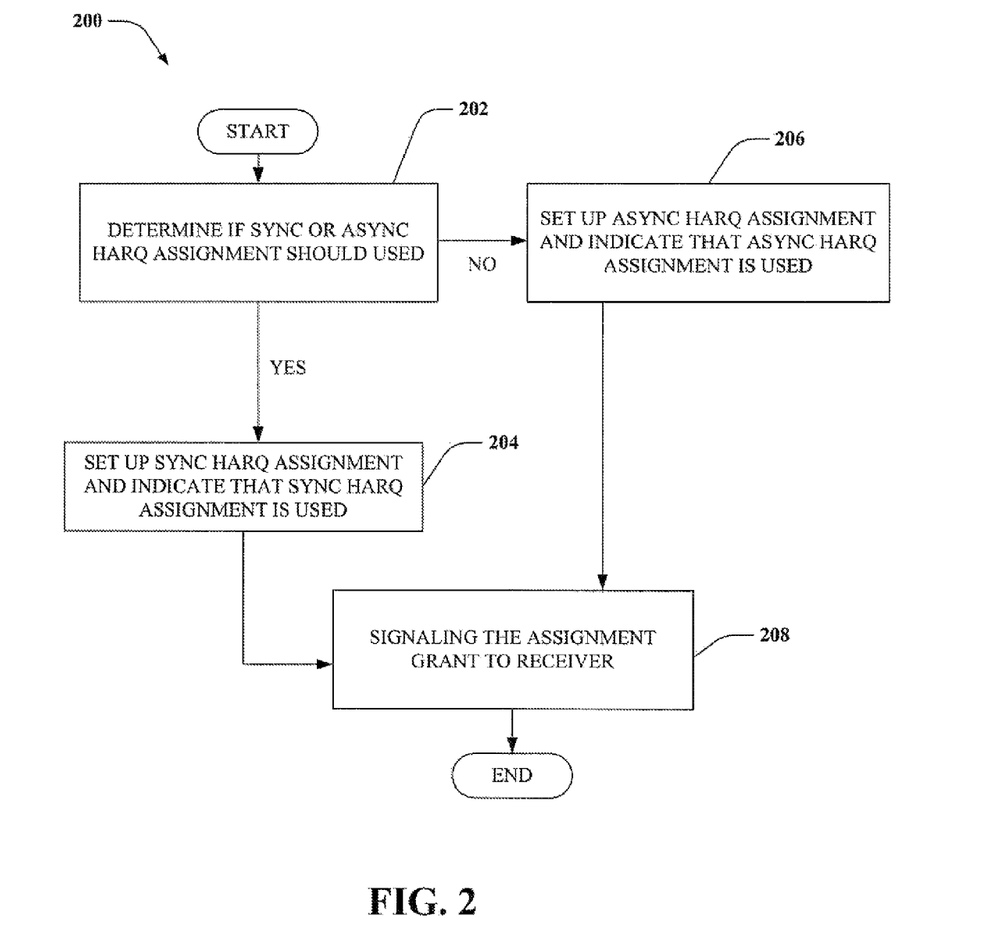
FIG. 2 is an illustration of an example methodology that facilitates a type of system employed by an access point in a wireless communications system.
Figure 3:
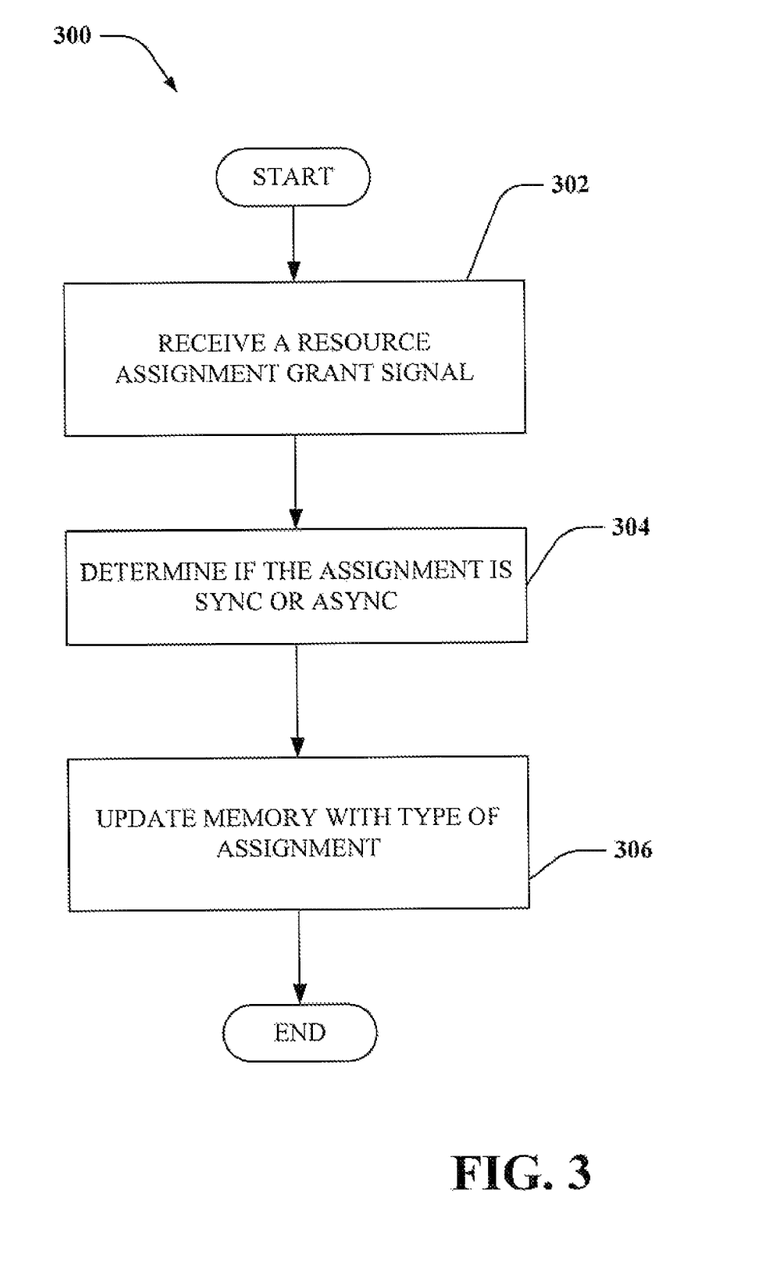
FIG. 3 is an illustration of an example methodology that facilitates a type of system employed by an access terminal in a wireless communications system.

Referring to FIGS. 2-3, methodologies relating to using a asynchronous and synchronous HARQ system is illustrated. While, for purposes of simplicity of explanation, the methodologies are shown and described as a series of acts, it is to be understood and appreciated that the methodologies are not limited by the order of acts, as some acts may, in accordance with the claimed subject matter, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter.

Turning specifically to FIG. 2, a methodology 200 that facilitates a use of synchronous as asynchronous HARQ in the same link of a wireless communication system (for example, OFDM or OFDMA systems) is illustrated. The method starts at 202, a determination is made as to whether to use Async HARQ or Sync HARQ assignment scheme for assigning wireless communication resources. Such determination may be made (e.g. by a scheduler of a transmitter) by checking required assignment overhead. For example, the use of Sync HARQ for assignments where the assignment overhead (the amount of resources required to communicate the assignment to the users) is significantly large (e.g. greater than a predetermined threshold). This is advantageous because only a single assignment is required for all retransmissions. However, where assignment overhead is small (e.g. less than a predetermined threshold), using Async HARQ is advantageous because it enables more flexibility in controlling delay and more flexibility in multi-user diversity (choosing to transmit when the channel is good). In addition, since Sync HARQ assignments persist through multiple retransmissions, they can tend to fragment the available air-interface resources creating a fragmented portion (no resources are assigned during a fragmented portion). In an aspect, Async HARQ assignment is ideal for utilizing available resources during the fragmented portions, thereby combating negative effects of such resource fragmentation. For example, during the portion that is fragmented by using the sync HARQ, one or more Async HARQ assignment may be used.

If the use of Sync HARQ is desired, the method moves to 204. At 204, a Sync HARQ assignment is set up and an indication is set up, using an indicator, which provides that the current assignment is Sync HARQ. For example, the transmitter may provide an indication using single bit to indicate whether an assignment is Async or Sync. For example, the transmitter may set the single bit to "1" for designating to receiver that the assignment grant is Sync HARQ and the transmitter may set the single bit to "0" for designating to receiver that the assignment grant is Async HARQ. The single bit may be part of the assignment grant message or separately provided. Depending of the bandwidth, more bits may be used to indicate where the assignment is Async or Sync HARQ. Various other methods may be utilized to provide an indication to the receiver of the type of HARQ used, for example the frequency range allocated for Sync HARQ assignment, as described above. In an aspect, the transmitter and receiver ar configured to know the method used to provide the indication.

If the use of Async HARQ is desired, the method moves to 206. At 206, an Async HARQ assignment is set up and an indication is set up, using an indicator, which provides that the current assignment is Async HARQ. For example, the transmitter may set the single bit to "0" for designating to receiver that the assignment grant is Async HARQ.

In an aspect, the resources may be allocated based on location of assignment within a predetermined frequency range and/or for predetermined time duration. For example, the scheduler may allocate a first frequency range for Sync HARQ assignments and may allocate a second frequency range for Async HARQ assignments. In this aspect, the frequency allocated for Sync or Async HARQ assignments may be predetermined based on various criteria, such as type of assignments or duration of assignment. In an aspect, the indication of which type of HARQ assignment (synchronous and asynchronous) is used may be provided to a terminal by signaling the frequency range used for allocating the resources. Alternatively, the mapping of type of HARQ assignment to frequency range may be provided or known prior to allocation of the resources. For example, when the access terminal registers with a base station that will provide the assignments of resources, the mapping is provided. Also, the indication of when and frequency range used for synchronous or asynchronous may be broadcasted all access terminals or provided to specific access terminals.

At 208, the user is signaled the assignment grant along with an indication of type of assignment used by the system. In an aspect, a broadcast channel may be used provide the indication of the type of assignment used by the system. For example, the designated bit may set and broadcast channel separate from assignment grant.

With reference now to FIG. 3, an example methodology 300 that facilitates a receiving an assignment grant in a wireless communications system is illustrated. The method begins at 302, a resource assignment grant signal is received. At 304, a determination is made whether the assignment is Async or Sync HARQ assignment. For example, a portion of the assignment grant message may be extracted to determine the value represented by the extracted portion. In an aspect, the single bit is extracted and analyzed. At 306, the receiver stores the analyzed information, whether the assignment was Async or Sync HARQ assignment, into memory of later use.

Figure 4:
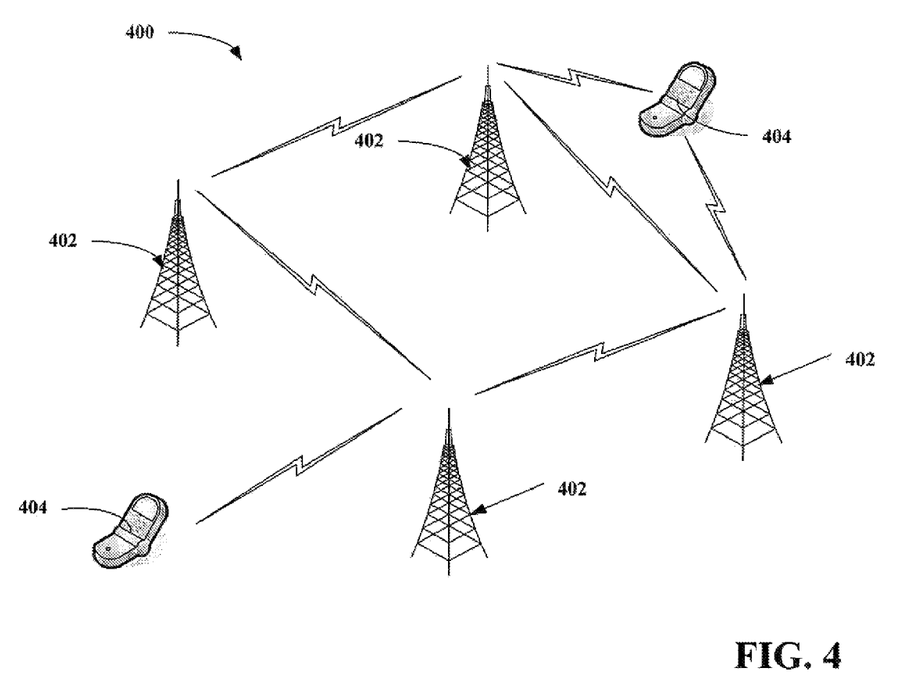
FIG. 4 is an illustration of a wireless communication system in accordance with various aspects set forth herein.

Referring now to FIG. 4, a wireless communication system 400 is illustrated in accordance with various embodiments presented herein. System 400 can comprise on or more base station 402 (e.g., access points) in one or more sectors that receive, transmit, repeat, etc., wireless communication signal to each other and/or to one or more mobile devices 404. Each base station 402 can comprise a transmitter chain and a receiver chain, each of which can in turn comprise a plurality of components associated with signal transmission and reception (e.g., processors, modulators, multiplexers, demodulators, demultiplexers, antennas, . . . ) as will be appreciated by one skilled in the art. Mobile devices 404 can be, for example, cellular phones, smart phones, laptops, handheld communication devices, handheld computing devices, satellite radios, global positioning systems, PDAs, and/or any other suitable device for communicating over wireless communication system 400.

Base stations 402 can broadcast content to mobile devices 404 by employing OFDM or OFDMA techniques. Frequency division based techniques such as OFDM typically separate the frequency spectrum into distinct channels; for instance, the frequency spectrum may be split into uniform chunks of bandwidth (frequency range). OFDM effectively partitions the overall system bandwidth into multiple orthogonal frequency channels. The frequency channels may use Sync or Async HARQ assignments, depending on the system requirements. Additionally, an ODFM system may use time and/or frequency division multiplexing to achieve orthogonality among multiple data transmissions for multiple base stations 402.

Figure 5:
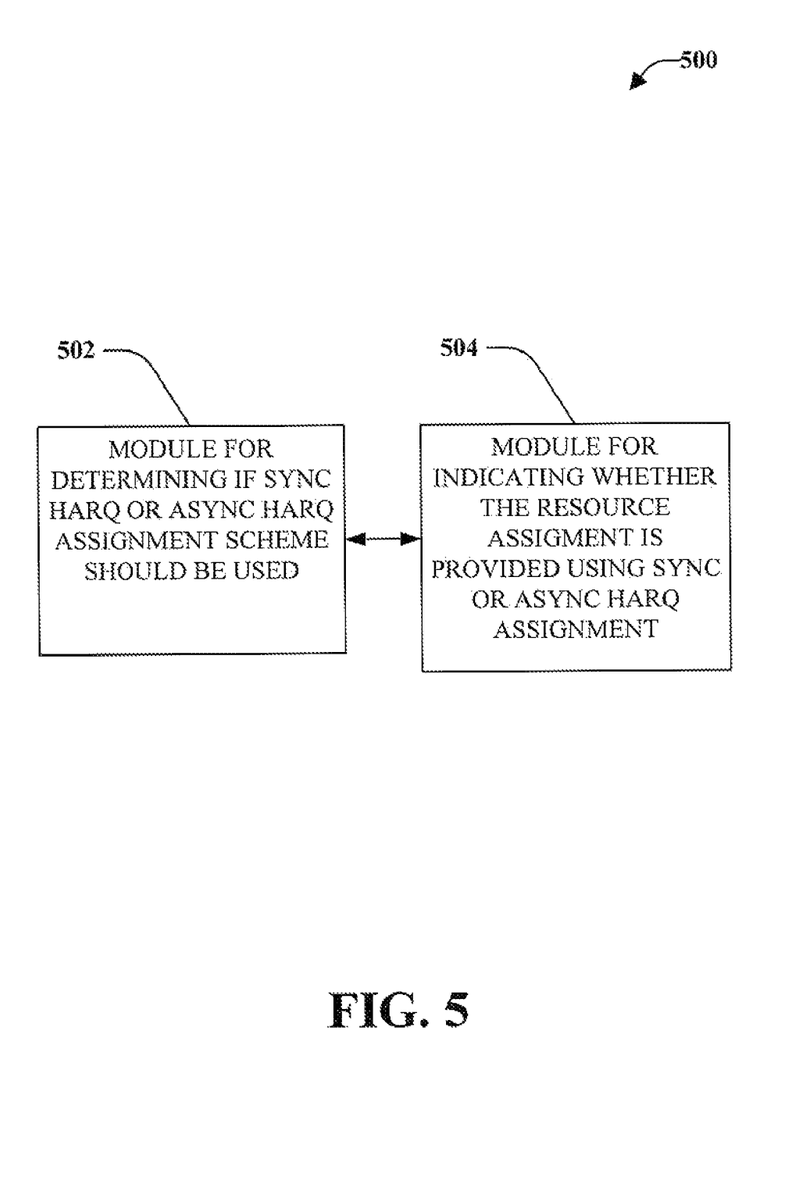
FIG. 5 is a block diagram of a system that facilitates a multiplexed downlink transmission according to mobile device capabilities.

Referring now to FIG. 5, a system 500 that facilitates optimal downlink transmission is illustrated. System 500 may include a module 502 for determining if a synchronous HARQ or an asynchronous HARQ assignment scheme should be used for providing resource assignment. System 500 may also include a module 504 for indicating whether the resource assignment is provided using the synchronous HARQ or an asynchronous HARQ assignment scheme. Modules 502 and 504 may be a processor or any electronic device.

Figure 6:
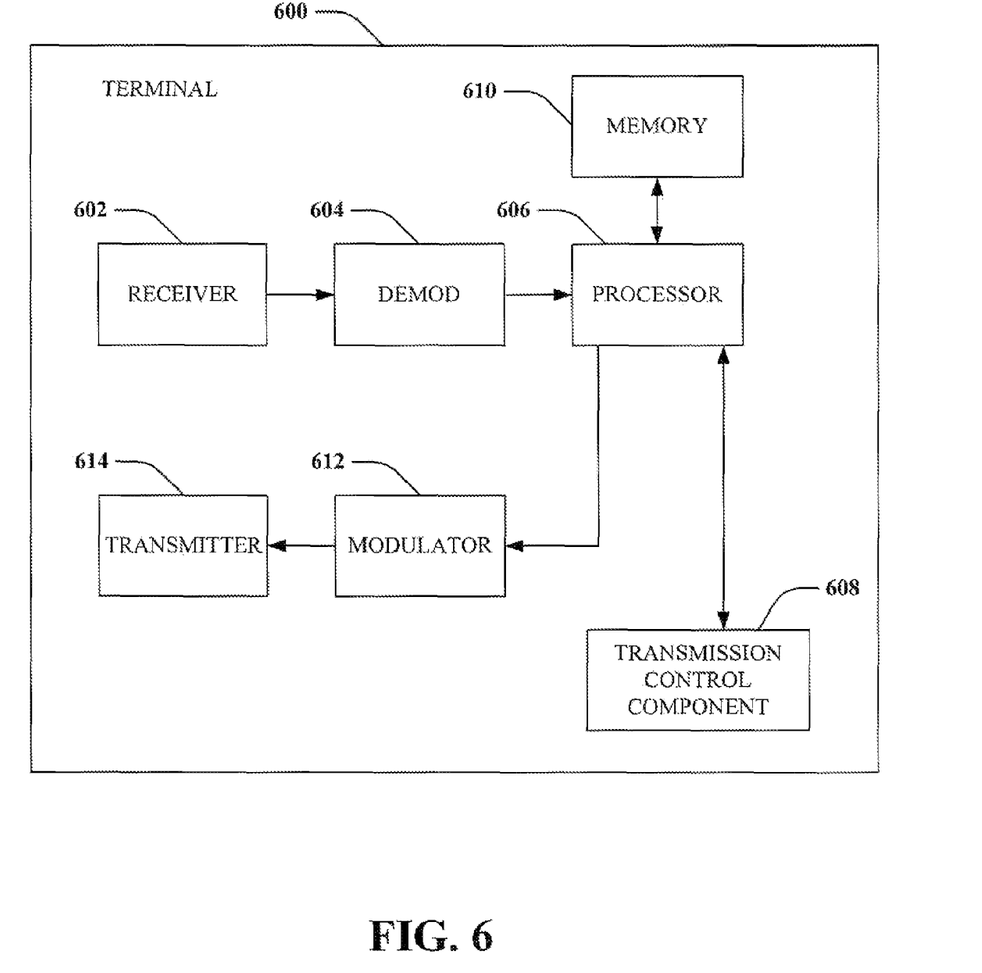
FIG. 6 illustrates a system that provides for other sector communication in accordance with one or more aspects presented herein.

FIG. 6 is an illustration of a terminal or user device 600 that provides for other sector communication in a wireless communication environment in accordance with one or more aspects set forth herein. Terminal 600 comprises a receiver 602 that receives a signal, for instance one or more receive antennas, and performs typical actions (e.g., filters, amplifies, downconverts, etc.) the received signal and digitizes the conditioned signal to obtain samples. A demodulator 604 can demodulate the samples and provide received pilot symbols to a processor 606.

Processor 606 can be a processor dedicated to analyzing information received by receiver component 602 and/or generating information for transmission by a transmitter 614. Processor 606 can be a processor that controls one or more components of terminal 600, and/or a processor that analyzes information received by receiver 602, generates information for transmission by a transmitter 614, and controls one or more components of terminal 600. Processor 606 can utilize any of the methodologies described herein, including those described with respect to FIGS. 2-3.

In addition, terminal 600 can include a transmission control component 608 that analyzes received input, including acknowledgements of successful transmissions. Acknowledgements (ACK) can be received from the serving sector and/or a neighboring sector. Acknowledgements can indicate that a previous transmission has been successfully received and decoded by one of the access points. If no acknowledgement is received, or if a negative acknowledgement (NAK) is received, the transmission can be resent. Transmission control component 608 can be incorporated into the processor 606. It is to be appreciated that transmission control component 608 can include transmission control code that performs analysis in connection with determining receipt of acknowledgement.

Terminal 600 can additionally comprise memory 610 that is operatively coupled to processor 606 and that can store information related to transmissions, an active set of sectors, methods for controlling transmissions, lookup tables comprising information related thereto, and any other suitable information related to transmissions and active set sectors as described herein. It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 610 of the subject systems and methods is intended to comprise, without being limited to, these and any other suitable types of memory. Processor 606 is connected to a symbol modulator 612 and transmitter 614 that transmits the modulated signal.

Figure 7:
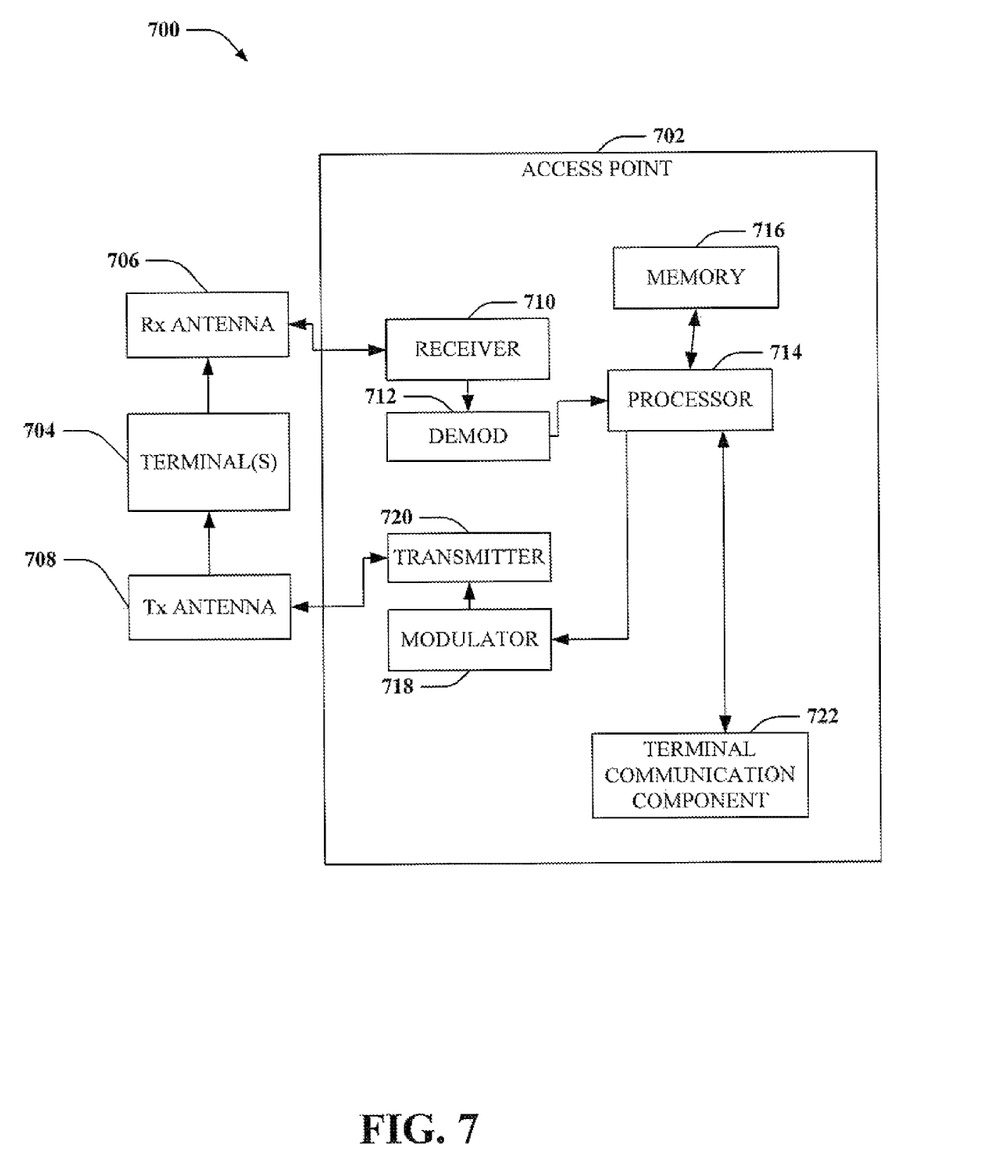
FIG. 7 illustrates a system that provides for processing reverse link communications at all non-serving sector of a terminal in accordance with one or more aspects presented herein.

FIG. 7 is an illustration of a system 700 that facilitates other sector communication in a communication environment in accordance with various aspects. System 700 comprises an access point 702 with a receiver 710 that receives signal(s) from one or more terminals 704 through one or more receive antennas 706, and transmits to the one or more terminals 704 through a plurality of transmit antennas 708. Terminals 704 can include those terminals supported by the access point 702, as well as terminals 704 supported by neighboring sectors. In one or more aspects, receive antennas 706 and transmit antennas 708 can be implemented using a single set of antennas. Receiver 710 can receive information from receive antennas 706 and is operatively associated with a demodulator 712 that demodulates received information. Receiver 710 can be, for example, a Rake receiver (e.g., a technique that individually processes multi-path signal components using a plurality of baseband correlators, . . . ), an MMSE-based receiver, or some other suitable receiver for separating out terminals assigned thereto, as will be appreciated by one skilled in the art. According to various aspects, multiple receivers can be employed (e.g., one per receive antenna), and such receivers can communicate with each other to provide improved estimates of user data. Demodulated symbols are analyzed by a processor 714 that is similar to the processor described above with regard to FIG. 10, and is coupled to a memory 716 that stores information related to terminals, assigned resources associated with terminals and the like. Receiver output for each antenna can be jointly processed by receiver 710 and/or processor 714. A modulator 718 can multiplex the signal for transmission by a transmitter 720 through transmit antennas 708 to terminals 704.

Access point 702 further comprises a terminal communication component 722, which can be a processor distinct from, or integral to, processor 714. Terminal communication component 722 can obtain resource assignment information for terminals supported by neighboring sectors. In addition, terminal communication component 722 can provide assignment information to neighboring sectors for terminals supported by access point 702. Assignment information can be provided via backhaul signaling.

Based upon information regarding assigned resources, terminal communication component 722 can direct detection of transmissions from terminals supported by neighboring sectors, as well as decoding of received transmissions. Memory 716 can maintain packets received from terminals prior to receipt of the assignment information necessary for decoding of packets. Terminal communication component 722 can also control transmission and receipt of acknowledgements indicating successful reception and decoding of transmissions. It is to be appreciated that terminal communication component 722 can include transmission analysis code that performs utility based control in connection with assigning resources, identifying terminals for soft handoff, decoding transmissions and the like. The terminal analysis code can utilize artificial intelligence based methods in connection with performing inference and/or probabilistic determinations and/or statistical-based determinations in connection with optimizing terminal performance.

Figure 8:
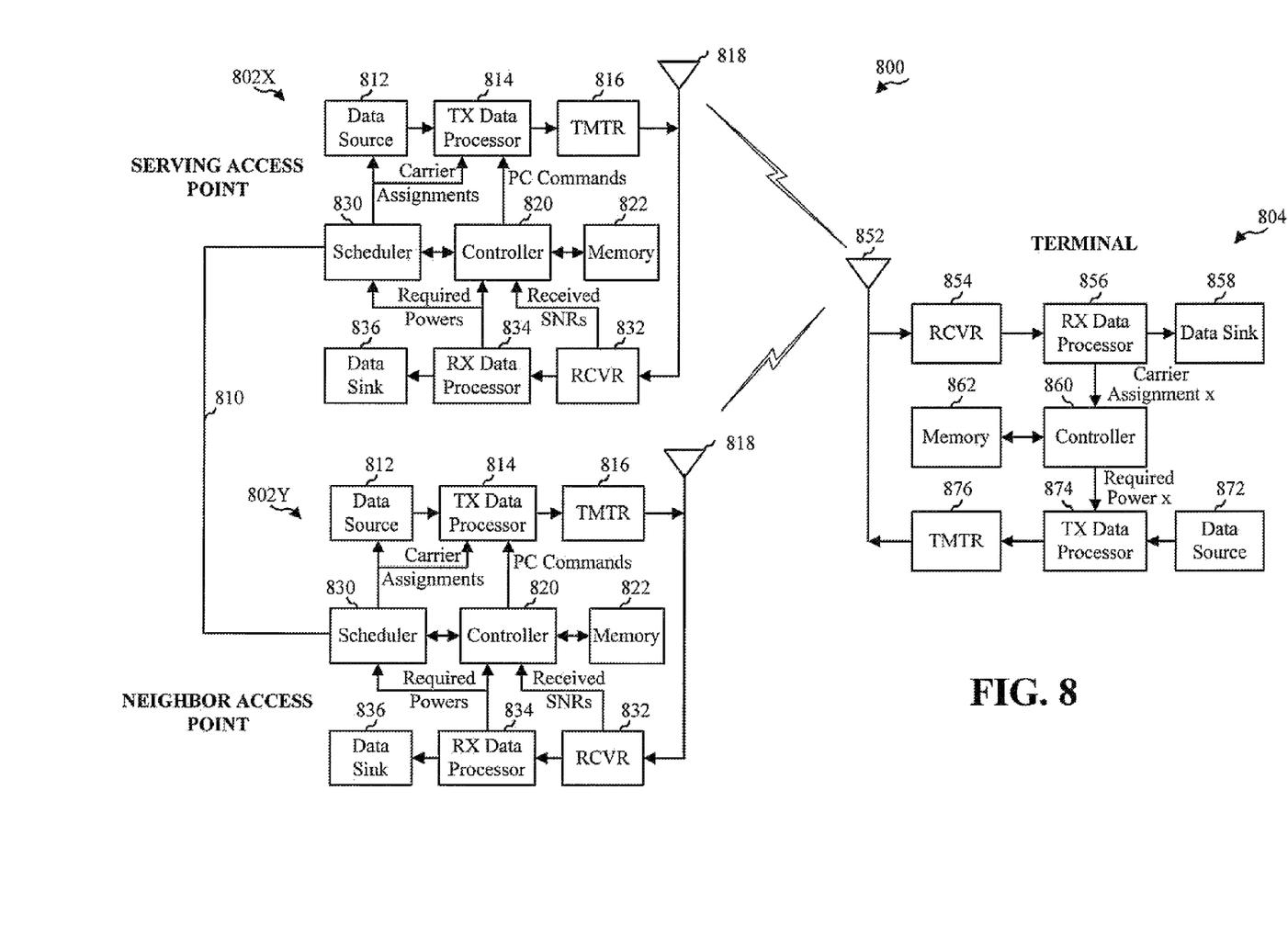
FIG. 8 is an illustration of a wireless communication environment that can be employed in conjunction with the various systems and methods described herein.

FIG. 8 shows an exemplary wireless communication system 800. The wireless communication system 600 depicts one terminal and two access points for sake of brevity. However, it is to be appreciated that the system can include one or more access point and/or more than one terminal, wherein additional access points and/or terminals can be substantially similar or different from the exemplary access points and terminal described below. In addition, it is to be appreciated that the access points and/or the terminal can employ the systems (FIGS. 1, 4-7) and/or methods (FIGS. 2-3) described herein.

FIG. 8 shows a block diagram of a terminal 804, a serving access point 802X point that supports terminal 1024 and a neighbor access point 802Y in multiple-access multi-carrier communication system 800. At access point 802X, a transmit (TX) data processor 814 receives traffic data (i.e., information bits) from a data source 812 and signaling and other information from a controller 820 and a scheduler 830. For example, scheduler 830 may provide assignments of carriers for the terminals. Additionally, a memory 822 can maintain information regarding current or previous assignments. TX data processor 814 encodes and modulates the received data using multi-carrier modulation (e.g., OFDM) to provide modulated data (e.g., OFDM symbols). A transmitter unit (TMTR) 816 then processes the modulated data to generate a downlink modulated signal that is then transmitted from an antenna 818.

Prior to transmission of assignment information to terminal 804, scheduler can provide assignment information to access point 802Y. The assignment information can be provided via backhaul signaling (e.g., a T1 line) 810. Alternatively, assignment information can be provided to access point 802Y after transmission to terminal 804.

At terminal 804, the transmitted and modulated signal is received by an antenna 852 and provided to a receiver unit (RCVR) 854. Receiver unit 854 processes and digitizes the received signal to provide samples. A received (RX) data processor 856 then demodulates and decodes the samples to provide decoded data, which may include recovered traffic data, messages, signaling, and so on. The traffic data may be provided to a data sink 858, and the carrier assignment information for the terminal 804 is provided to a controller 860.

Controller 860 directs data transmission on the uplink using the specific carriers that have been assigned to terminal 804 and indicated in the received carrier assignment. A memory 862 can maintain information regarding assigned resources (e.g., frequency, time and/or code) and other related information.

For terminal 804, a TX data processor 874 receives traffic data from a data source 872 and signaling and other information from controller 860. The various types of data are coded and modulated by TX data processor 874 using the assigned carriers and further processed by a transmitter unit 876 to generate an uplink modulated signal that is then transmitted from antenna 852.

At access points 802X and 802Y, the transmitted and modulated signals from terminal 804 are received by antenna 818, processed by a receiver unit 832, and demodulated and decoded by an RX data processor 834. Transmitted signals can be decoded based upon assignment information generated by serving access point 802X and provided to neighbor access point 802Y. In addition, access points 802X and 802Y can generate an acknowledgement (ACK) that can be provided to the other access point (802X or 802Y) and/or to terminal 804. The decoded signals can be provided to a data sink 836. Receiver unit 832 may estimate the received signal quality (e.g., the received signal-to-noise ratio (SNR)) for each terminal and provide this information for each terminal to controller 820 and scheduler 830.

Scheduler 830 uses the feedback information to perform a number of functions such as (1) selecting a set of terminals for data transmission on the reverse link and (2) assigning carriers to the selected terminals. The carrier assignments for the scheduled terminals are then transmitted on the forward link to these terminals.

The techniques described herein may be implemented by various means. For example, these techniques may be implemented in hardware, software, or a combination thereof. For a hardware implementation, the processing units (e.g., controllers 820 and 860, TX and RX processors 814 and 834, and so on) for these techniques may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

What has been described above includes examples of one or more aspects. It is, of course, not possible to described every conceivable combination of components or methodologies for purposes of describing the aforementioned aspects, but one of ordinary skill in the art may recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of using Hybrid Automatic Repeat Request (HARQ) assignment in a wireless communication network, comprising:
    determining if a synchronous HARQ or an asynchronous HARQ assignment scheme should be used for providing a resource assignment, the synchronous HARQ assignment scheme being used if an assignment overhead is greater than a threshold and the asynchronous HARQ assignment scheme being used if the assignment overhead is less than the threshold; and
    transmitting over the wireless communication network an indication of whether the resource assignment is provided using the synchronous HARQ or an asynchronous HARQ assignment scheme.

2. The method of claim 1, wherein transmitting the indication comprises setting an indicator that is signaled to a receiver.

3. The method of claim 2, wherein the setting of the indicator comprises setting an indicator bit to a "1" for asynchronous HARQ assignment and setting the indicator bit to a "0" for synchronous HARQ assignment.

4. The method of claim 1, further comprising allocating a frequency range for the HARQ assignment, wherein a first frequency range is allocated for synchronous HARQ assignment scheme and a second frequency range is allocated for asynchronous HARQ assignment scheme.

5. The method of claim 4, wherein the transmitting the indication comprises signaling over a broadcast channel the frequency range used for synchronous and asynchronous HARQ assignment scheme.

6. The method of claim 1, wherein transmitting the indication comprises setting a single bit that is signaled to a receiver over a broadcast channel.

7. The method of claim 1, further comprising using the asynchronous HARQ assignment if an assignment overhead is small.

8. The method of claim 1, further comprising using the synchronous HARQ assignment if an assignment overhead is large.

9. The method of claim 1, further comprises using the asynchronous HARQ assignment during a fragment portion of the resource assignment.

10. The method of claim 1, wherein the assignment overhead is a measure of an amount of resources required to communicate an assignment to a user.

11. The method of claim 10, wherein the required resources to communicate the assignment message comprise the number of bits in an assignment message header.

12. An apparatus for using Hybrid Automatic Repeat Request (HARQ) assignment in a wireless communication network, comprising:
    means for determining if a synchronous HARQ or an asynchronous HARQ assignment scheme should be used for providing a resource assignment, the synchronous HARQ assignment scheme being used if an assignment overhead is greater than a threshold and the asynchronous HARQ assignment scheme being used if the assignment overhead is less than the threshold; and means for indicating whether the resource assignment is provided using the synchronous HARQ or an asynchronous HARQ assignment scheme.

13. The apparatus of claim 12, wherein the means for indicating comprises means for setting an indicator that is signaled to a receiver.

14. The apparatus of claim 13, wherein the means for setting of the indicator comprises means for setting an indicator bit to a "1" for asynchronous HARQ assignment and means for setting the indicator bit to a "0" for synchronous HARQ assignment.

15. The apparatus of claim 12, further comprising allocating a frequency range, wherein a first frequency range is allocated for synchronous HARQ assignment scheme and a second frequency range is allocated for asynchronous HARQ assignment scheme.

16. The apparatus of claim 15, wherein the indicting comprises signaling over a broadcast channel the frequency range used for synchronous and asynchronous HARQ assignment scheme.

17. The apparatus of claim 12, wherein the means for indicating comprises means for setting a single bit that is signaled to a receiver over a broadcast channel.

18. The apparatus of claim 12, further comprising means for using the asynchronous HARQ assignment if an assignment overhead is small.

19. The apparatus of claim 12, further comprising means for using the synchronous HARQ assignment if an assignment overhead is large.

20. The apparatus of claim 12, further comprises using the asynchronous HARQ assignment during a fragment portion of the resource assignment.

21. An apparatus for scheduling Hybrid Automatic Repeat Request (HARQ) assignment in a wireless communication network, comprising:
a scheduler configured to determine if a synchronous HARQ or an asynchronous HARQ assignment scheme should be used for providing a resource assignment, the synchronous HARQ assignment scheme being used if an assignment overhead is greater than a threshold and the asynchronous HARQ assignment scheme being used if the assignment overhead is less than the threshold; and
wherein the scheduler is further configured to indicate whether the resource assignment is provided using the synchronous HARQ or an asynchronous HARQ assignment scheme.

22. The apparatus of claim 21, wherein the scheduler is further configured to set an indicator that is signaled to a receiver.

23. The apparatus of claim 22, wherein the setting of the indicator comprises setting an indicator bit to a "1" for asynchronous HARQ assignment and setting the indicator bit to a "0" for synchronous HARQ assignment.

24. The apparatus of claim 21, wherein the scheduler is further configured to allocate a frequency range for the HARQ assignment, wherein a first frequency range is allocated for synchronous HARQ assignment scheme and a second frequency range is allocated for asynchronous HARQ assignment scheme.

25. The apparatus of claim 24, wherein the scheduler is further configured to signal over a broadcast channel the frequency range used for synchronous and asynchronous HARQ assignment scheme.

26. The apparatus of claim 21, wherein the scheduler is further configured to set as an indicator a single bit that is signaled to a receiver over a broadcast channel.

27. The apparatus of claim 21, wherein the scheduler is further configured to use the asynchronous HARQ assignment if an assignment overhead is small.

28. The apparatus of claim 21, wherein the scheduler is further configured to use the synchronous HARQ assignment if an assignment overhead is large.

29. The apparatus of claim 21, wherein the scheduler is further configured to use the asynchronous HARQ assignment during a fragment portion of the resource assignment.

30. The apparatus of claim 21, wherein the assignment overhead is a measure of an amount of resources required to communicate an assignment to a user.

31. The apparatus of claim 30, wherein the required resources to communicate the assignment message comprise the number of bits in an assignment message header.

32. A non-transitory computer readable medium having stored thereon computer executable instructions for performing the following acts for Hybrid Automatic Repeat Request (HARQ) assignment in a wireless communication network:
determining if a synchronous HARQ or an asynchronous HARQ assignment scheme should be used for providing a resource assignment, the synchronous HARQ assignment scheme being used if an assignment overhead is greater than a threshold and the asynchronous HARQ assignment scheme being used if the assignment overhead is less than the threshold; and
transmitting an indication of whether the resource assignment is provided using the synchronous HARQ or an asynchronous HARQ assignment scheme.

33. A method of using Hybrid Automatic Repeat Request (HARQ) assignment in a wireless communication network, comprising:
receiving a resource assignment grant transmitted over the wireless communication network; and
determining if the resource assignment uses a synchronous HARQ or an asynchronous HARQ assignment scheme, the synchronous HARQ assignment scheme being used if an assignment overhead is greater than a threshold and the asynchronous HARQ assignment scheme being used if the assignment overhead is less than the threshold.

34. A receiver for using Hybrid Automatic Repeat Request (HARQ) assignment in a wireless communication network, comprising:
a processor configured to receive a resource assignment grant, wherein the processor is configured to determine if the resource assignment grant uses a synchronous HARQ or an asynchronous HARQ assignment scheme, the synchronous HARQ assignment scheme being used if an assignment overhead is greater than a threshold and the asynchronous HARQ assignment scheme being used if the assignment overhead is less than the threshold.

35. The receiver of claim 34, the processor further configured to receive an indicator that is set and signaled to the receiver.

36. The receiver of claim 35, wherein the indicator comprises an indicator bit set to a "1" for asynchronous HARQ assignment and the indicator bit set to a "0" for synchronous HARQ assignment.

37. The receiver of claim 34, wherein a frequency range for the HARQ assignment includes a first frequency range for the synchronous HARQ assignment scheme and a second frequency range for the asynchronous HARQ assignment scheme.

38. The receiver of claim 37, wherein the processor is further configured to receive over a broadcast channel the frequency range used for synchronous and asynchronous HARQ assignment scheme.

39. The receiver of claim 34, wherein the processor is further configured to receive as an indicator a single bit that is received at the receiver over a broadcast channel.

40. The receiver of claim 34, wherein the assignment overhead is a measure of an amount of resources required to communicate an assignment to a user.

41. The receiver of claim 40, wherein the required resources to communicate the assignment message comprise the number of bits in an assignment message header.

* * * * *